United States Patent [19]

VerPlanck

[11] Patent Number: 4,535,521
[45] Date of Patent: Aug. 20, 1985

[54] SOCKETING MACHINE HOSE PULL

[75] Inventor: James A. VerPlanck, Jackson, Mich.

[73] Assignee: Aeroquip Corporation, Jackson, Mich.

[21] Appl. No.: 526,013

[22] Filed: Aug. 24, 1983

[51] Int. Cl.³ .............................................. B23P 19/04
[52] U.S. Cl. ...................................... 29/235; 29/237; 29/240
[58] Field of Search ......................... 29/237, 240, 235; 173/147

[56] References Cited

U.S. PATENT DOCUMENTS

| 647,274 | 4/1900 | Moran et al. | 173/147 X |
| 1,001,560 | 8/1911 | Sanderson | 173/147 X |
| 1,498,492 | 6/1924 | Stretausky | 173/147 X |
| 2,226,702 | 12/1940 | Berger et al. | 29/88.2 |
| 2,878,026 | 3/1959 | Pioch | 29/240 X |
| 3,944,204 | 3/1976 | Cesar | 108/20 X |
| 4,404,721 | 9/1983 | Ohyama | 29/240 X |

OTHER PUBLICATIONS

Aeroquip Corporation Industrial Engineering Bulletins IEB 177A and 180A entitled "FT1013 Portable Hose Assembly Machine", and FT1097 Portable Hose Assembly Machine, respectively, copyrighted 1973 and 1981, respectively.

Primary Examiner—Frederick R. Schmidt
Assistant Examiner—Steven P. Schad
Attorney, Agent, or Firm—Beaman & Beaman

[57] ABSTRACT

A machine for assembling flexible hose to hose end fittings utilizing a socket. In such machines the socket is chucked and rotated and the hose end is inserted into the socket for engagement by the internal spiraled socket serrations. In the invention, manually operated force multiplying apparatus in the form of a winch forces the hose clamp and hose, toward the socket, and by use of a reversing bar the winch may be used to disassemble the hose and socket by reversing the direction of axial force on the hose.

3 Claims, 3 Drawing Figures

SOCKETING MACHINE HOSE PULL

BACKGROUND OF THE INVENTION

Detachable or reusable fittings for flexible hose have the advantage of permitting hose assemblies of various lengths to be readily produced with a minimum inventory of parts. Hose wound upon a spool merely need be cut to the desired length and a fitting assembled to each hose end to complete the assembly. Such fittings commonly employ a nipple received within the hose bore and a socket threaded upon the nipple engages the exterior surface of the hose end in radial spaced alignment with the nipple. In this manner the hose end is firmly gripped between the nipple and the socket establishing a fluid tight relationship between the hose and fitting, and threads, nuts or other connection structure mounted upon the nipple permits the fitting to be connected to the other components of the system. A typical detachable hose and fitting of this type is shown in U.S. Pat. No. 2,226,702.

With hose fittings of this type, the socket usually includes internal serrations for increasing the frictional engagement of the socket with the hose cover, and such serrations are typically of a spiral or thread configuration permitting the socket to be "threaded" upon the hose end. Usually, the spiraled or helical socket serrations are of a rounded configuration to prevent cutting or tearing of the hose cover.

When assembling fittings and hose of large diameter, i.e. hose having an OD of 2 inches or greater, considerable torque is required to thread the socket upon the hose, and commonly, the hose must be firmly clamped and a wrench is applied to the socket to produce the necessary torque.

Where a significant number of hose assemblies are assembled, such as in the plant of an industrial equipment manufacturer, or a hose distributor, it is common to employ powered machines for assembling the fittings upon flexible hose, and in such machines the hose is clamped against rotation, while the socket is chucked and rotated by an electric motor. As the socket is rotated the hose is manually pushed into the rotating socket to produce the assembly. Such hose assembly machines are sold by the assignee identified as Model Nos. FT1013 and FT1097.

In the operation of the aforedescribed assembly machines the axial movement of the hose relative to the socket is produced manually, and considerable axial force on the hose is often required, especially with the larger sizes of hose and sockets, but, heretofore, power or force multiplying means were not available for axially translating the hose and considerable effort was required by the operator when assembling or disassembling hose and fittings.

It is an object of the invention to provide a hose assembly machine wherein manually operated force multiplying hose feeding means are utilized to feed the hose into a rotating socket, or retract the hose therefrom, and thereby substantially reduce the effort required for hose assembly or disassembly.

An additional object of the invention is to provide a manual hose feeding or disassembly means for use with existing powered hose assembly machines wherein the apparatus of the invention may be retroactively fitted to existing hose assembly machines with a minimum of modification thereto.

Yet another object of the invention is to provide manual means for feeding and retracting hose relative to a fitting socket when the apparatus is economical to produce and use, and may be readily utilized by operators of ordinary skill.

In the practice of the invention, the hose assembly machine commonly consists of a powered chuck mounted upon a chuck frame and a reversible electric motor selectively rotating the chuck and clamped socket in either direction of rotation. Guide means parallel to the axis of chuck rotation support a hose clamp wherein the clamp, and clamped hose, is movable in a direction parallel to the axis of socket rotation, and the hose end is maintained coaxial with the socket. Such apparatus is known, as described above, and during socket rotation manual axial displacement of the hose clamp and hose toward the socket permits the hose to enter the socket and be threaded therein upon the socket serrations.

In the practice of the invention, a shaft is rotatably mounted upon the apparatus frame upon bearings, and hexagonal drive heads mounted upon the ends of the reel shaft permit the shaft to be rotated by means of a conventional ratchet wrench. A nylon web or strap is affixed at one end to the reel shaft, and the other end of the reel shaft is attached to the hose clamp. As the reel shaft is located on the frame in the direction of the chuck relative to the location of the hose clamp, rotation of the reel shaft by the ratchet wrench winds the strap upon the shaft, pulling the hose clamp toward the chuck, and in this manner the hose clamp, and hose, are "winched" toward the rotating socket for hose assembly purposes.

When using the invention to disassemble hose from a socket, a reversing bar is mounted upon the ends of the hose clamp guides and the strap passes around the outer portion of the reversing bar prior to being affixed to the hose clamp. As the location of the reversing bar locates the bar at a greater distance from the chuck than the hose clamp, tensioning of the strap will displace the hose clamp, and hose, away from the chuck and the socket producing the necessary axial force on the hose to permit disassembly of the hose and socket.

The apparatus of the invention is of a relatively simple configuration, readily manufacturable and saleable at moderate expense, yet the invention permits high axial forces to be readily mechanically imposed upon the hose within a hose assembly machine substantially reducing the manual effort required for hose assembly and disassembly purposes.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
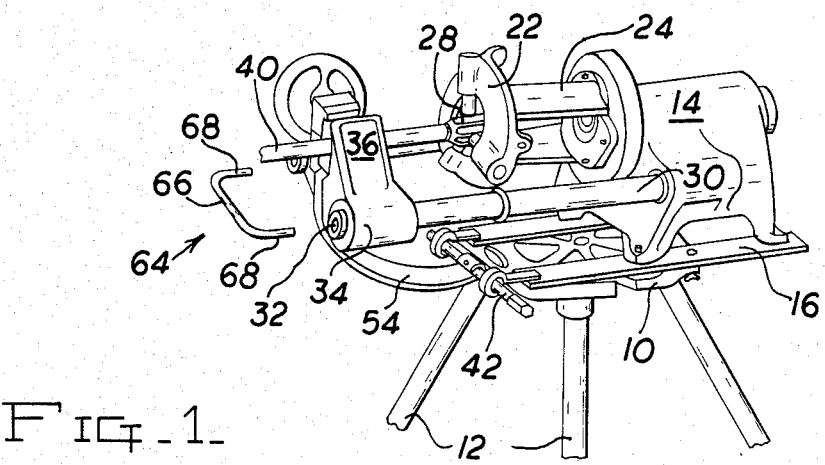
FIG. 1 is a perspective view of a hose assembly machine in accord with the invention illustrating the hose clamp at its outer location, the reversing bar being shown in exploded relationship to the hose clamp guides, and the strap attached to the hose clamp in the assembly mode.

The present invention pertains to the apparatus for manually mechanically feeding and retracting the hose clamp on a hose assembly machine relative to the chuck, by force multiplying means and in the drawings, use of the apparatus with known hose assembly machine is illustrated. Such a hose assembly machine includes a frame 10 supported upon tripod legs 12, and a power head 14 is mounted upon the frame upon a pair of metal straps 16, each having a front end region 18. The power head 14 includes an electric motor within the head, not shown, operably connected to the rotatable head plate 20, wherein the head plate can be rotated in either direction by conventional bi-directional switches, which may include a foot operated switch, as is known. Head plate includes a chuck 22 attached to the head plate by extensions 24, and the chuck includes radially movable jaws 26 for firmly gripping a hose fitting socket 28.

Figure 2:
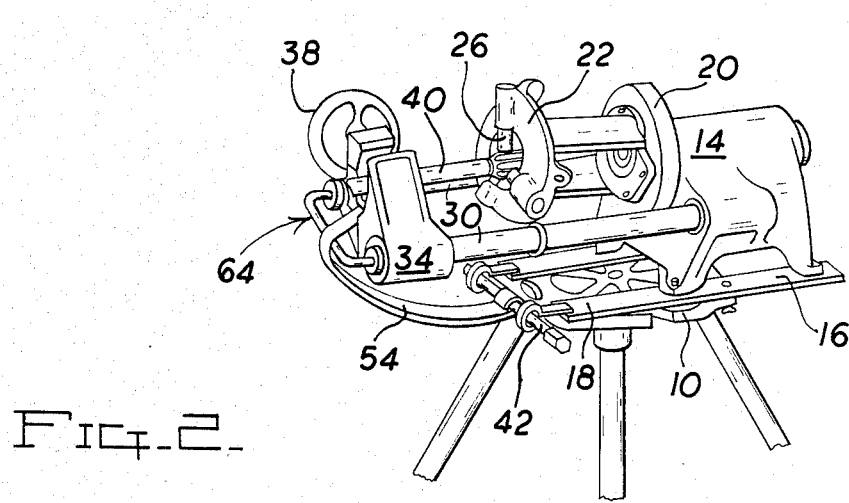
FIG. 2 is a perspective view of the apparatus of the invention illustrating the reversing bar in place and the strap attached to the hose clamp in the hose disassembly mode.

The power head 14 supports a pair of parallel cylindrical guides 30 which are parallel to the axis of rotation of the chuck 22 and terminate at their outer ends, which are provided with a bore 32. A hose clamp 34 is slidably mounted upon the guides 30 for movement toward and away from the chuck 22, and the hose clamp includes jaws 36 adjustable by means of a screw and wheel 38. The hose clamp jaws 36 include a V-shaped notch for holding the hose 40 wherein the hose end will be in axial alignment with the socket 28, as shown in FIGS. 1 and 2.

Hose assembly apparatus of the aforedescribed type is used by chucking the socket 28 within the chuck jaws 26, and clamping the hose 40 within the hose clamp 34 by tightening of the screw wheel 38. The chuck 22 and socket is rotated in the desired direction by energizing the motor driving the chuck, and the operator manually pushes upon the hose clamp 34, forcing the hose toward the socket wherein the hose end enters the socket, engages the spiral socket serrations and continuing axial pressure is maintained upon the hose and hose clamp until the hose has fully entered the socket and "bottoms out". At such time the rotation of the socket is terminated and the assembly of socket and hose is completed. Disassembly of the hose from the socket is accomplished by reversing the above sequence, and a "pull" is applied to the hose and hose clamp by the operator to aid in the unthreading of the hose from the socket.

With larger sizes of hose, the aforementioned assembly procedure requires extensive effort by the operator as the entering of the hose into the socket is often difficult to achieve and the frictional engagement between the spiral serrations of the socket and hose is not sufficient to "draw" the hose into the socket.

In the practice of the invention a reel shaft 42 is rotatably mounted upon the front ends of the power head mounting straps 16, as apparent from the drawing. This mounting is achieved by utilizing brackets 44 each having a bearing 46 which rotatably supports the shaft 42. The brackets 44, being of a "U" configuration, are provided with aligned holes wherein bolts 48 may be inserted through holes in the brackets and the straps to firmly mount the reel shaft to the straps at a location substantially below the chuck 22.

Figure 3:
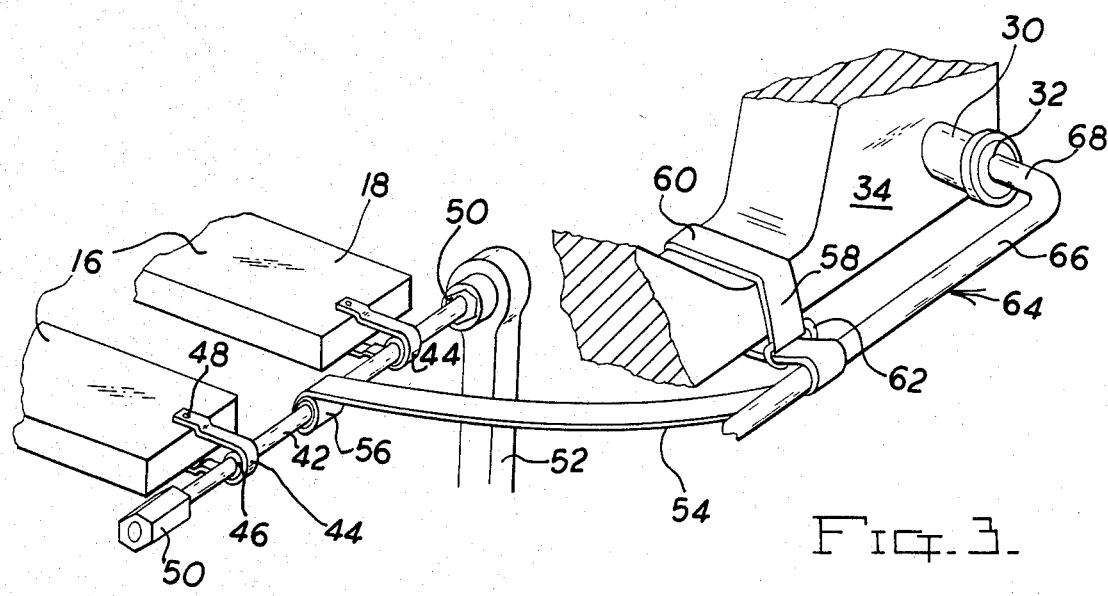
FIG. 3 is an enlarged, detail, perspective view of the reel shaft, reversing bar and associated components.

The ends of the reel shaft 42 are each provided with a hexagonal head 50 which forms a drive head which may be received within the socket of a conventional socket ratchet wrench 52, FIG. 3, wherein the shaft may be readily rotated with a high torque by the ratchet wrench.

A nylon web or strap 54 includes an end 56 which is wound upon the reel shaft 42 and to assure winding of the strap upon the shaft, a screw, not shown, extends through the strap end and is threaded into the shaft. Thus, rotation of the reel shaft will cause the strap 54 to wind upon the shaft in a winch type of relationship as apparent in FIG. 3.

The outer end 58 of the strap 54 includes a loop 60 formed by D ring 62 permitting the outer end of the strap to be attached to the hose clamp 34 as apparent in FIG. 3. Of course, the looped outer end of the strap will be attached to the hose clamp prior to the other end of the strap being affixed to the reel shaft 42.

As the reel shaft 42 is located in the direction of the chuck 22 relative to the normal position of the hose clamp 34, it will be appreciated that winding of the strap 54 upon the shaft by the wrench 52 will draw the hose clamp, and clamped hose 40, toward the chuck and chucked socket 28. Thus, during assembly of a hose and socket, the operator will oscillate the ratchet wrench 52 to produce the necessary torque upon the reel shaft to pull the hose clamp 34 and hose in the direction of the chuck and socket to permit the assembly operation to take place with a minimum effort on the part of the operator.

If it is desired to use the reel shaft 42 to disassemble a hose 40 from a fitting socket 28, the U-shaped reversing bar 64 is utilized. The reversing bar includes a base 66 and legs 68, and the legs 68 are readily received within the bores 32 defined in the ends of the guides 30. Thus, by unwinding the reel shaft to permit sufficient slack in the strap 54 the reversing bar may be slipped "inside" the strap and the legs 68 inserted into the guide end bores as shown in FIG. 3. In this relationship the strap will be "outside" of the reserving bar, and the tensioning of the strap will pull the hose clamp 34 away from the chuck and chucked socket permitting high axial forces to be applied to the hose 40 for disassembly purposes.

Of course, when using the apparatus as aforedescribed, it is necessary that the chuck motor rotate the chuck in that direction commensurate with the operation underway and the operator, will, at all times, maintain close control of the operation of the power head motor.

It will be appreciated that the reel shaft 42 and associated components are of a readily manufacturable form and configuration, and may be produced at a reasonable cost. The ease with which the apparatus may be assembled to existing hose assembly machines permits the apparatus to be retrofitted to existing hose assembly machines with little modifications.

It is to be appreciated that for the apparatus to function as described, the reel shaft must be located closer to the chuck 22 than the normal position of the hose clamp wherein tensioning of the strap will permit sufficient axial displacement of the hose clamp to achieve the desired purpose. Of course, the reel shaft may be attached to the assembly machine apparatus at a location different than that illustrated and described, as long as tensioning of the strap will draw the hose clamp toward the chuck, and it is understood that other modifications to the inventive concepts may be apparent to those skilled in the art without departing from the spirit and scope of the invention.

I claim:

1. Apparatus for assembling a hose fitting socket having an internally spirally, serrated recess, having an axis to the end of a flexible hose, wherein the apparatus includes a frame rotatably supporting a socket holding chuck having an axis whereby the socket may be rotated about its axis, power drive means drivingly connected to the chuck, a hose clamp adapted to clamp a flexible hose, guide means mounting the hose clamp upon the frame in substantial alignment with the chuck axis for reciprocal movement toward and away from the chuck, the improvement comprising, manually operated force multiplying hose clamp translating means mounted upon the frame operatively connected to the hose clamp for selectively translating the hose clamp upon the guide means toward and away from the chuck to aid in assembling and disassembling of a chucked socket and a hose held within the hose clamp, said manually operated hose clamp translating means comprising a winch defined by a shaft rotatably mounted upon the frame below the chuck at a location closer to the chuck than the hose clamp having a length substantially perpendicular to the chuck axis and an accessible end, a flexible strand wound upon said shaft having an outer end attached to the hose clamp, and manual shaft rotating means defined on said shaft end.

2. In an apparatus for assembling a hose fitting as in claim 1, said manual shaft rotating means comprising a wrench engaging hub fixed upon said shaft end, said strand comprising a web adapted to be wound upon said shaft.

3. Apparatus for assembling a hose fitting socket having an internally spirally, serrated recess, having an axis to the end of a flexible hose, wherein the apparatus includes a frame rotatably supporting a socket holding chuck having an axis whereby the socket may be rotated about its axis, power drive means drivingly connected to the chuck, a hose clamp adapted to clamp a flexible hose, guide means mounting the hose clamp upon the frame in substantial alignment with the chuck axis for reciprocal movement toward and away from the chuck, the improvement comprising, manually operated force multiplying hose clamp translating means mounted upon the frame operatively connected to the hose clamp for selectively translating the hose clamp upon the guide means toward and away from the chuck to aid in assembling and disassembling of a chucked socket and a hose held within the hose clamp, said manually operated hose clamp translating means comprising a winch rotatably mounted upon the frame at a location closer to the chuck than the hose clamp, a flexible strand wound upon said winch having an outer end attached to the hose clamp, manually operating means connected to said winch, the guide means including a pair of substantially parallel guides, each having an end located a greater distance from the chuck than the hose clamp and each end having an axial bore defined therein, said hose clamp translating means including a U-shaped reversing bar having a base and parallel legs extending from said base in a common direction, said legs being received within the guide's bores whereby said base bridges the guides adjacent said ends thereof and passing of said strand about said bar base permits said winch to translate the hose clamp away from the chuck.

* * * * *